Figure 6:
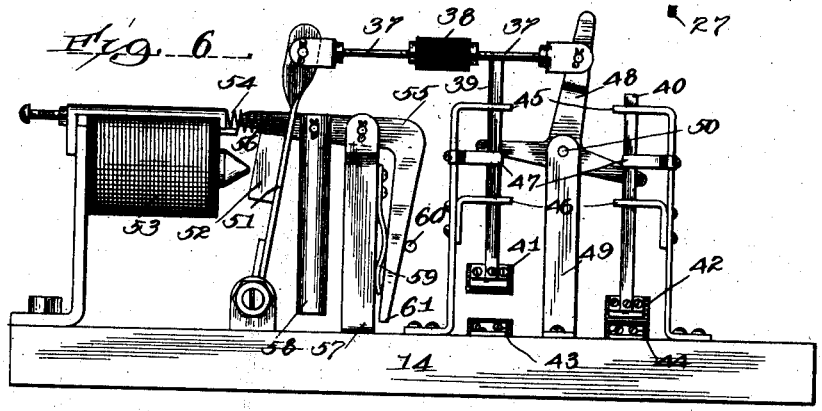

No. 706,586. Patented Aug. 12, 1902.
J. J. McGILL.
AUTOMATIC ELECTROMECHANICAL SEMAPHORE SIGNAL.
(Application filed Aug. 19, 1901.)
(No Model.) 6 Sheets—Sheet 1.
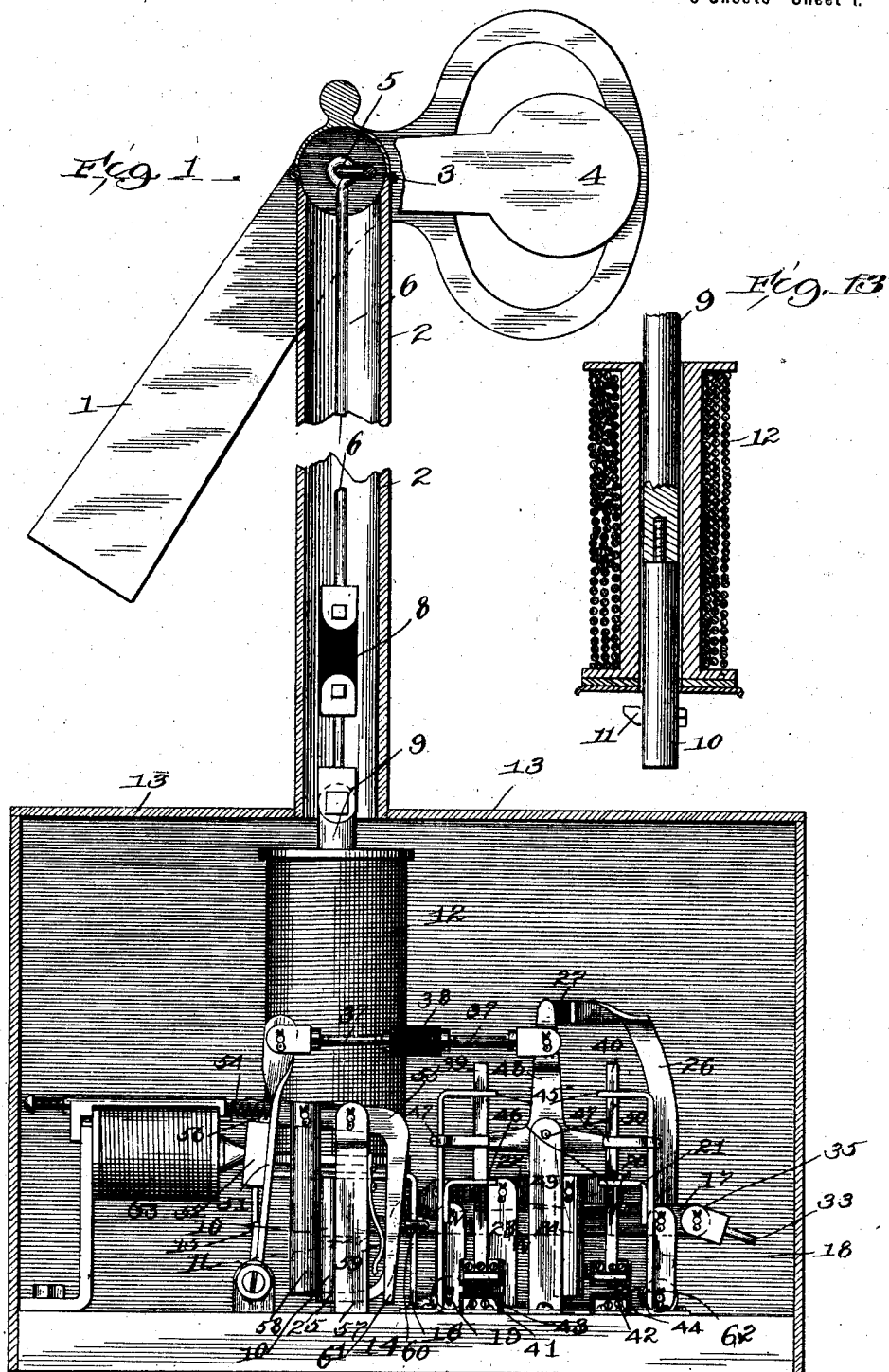

No. 706,586. Patented Aug. 12, 1902.
J. J. McGILL.
AUTOMATIC ELECTROMECHANICAL SEMAPHORE SIGNAL.
(Application filed Aug. 19, 1901.)
(No Model.)
6 Sheets—Sheet 2.
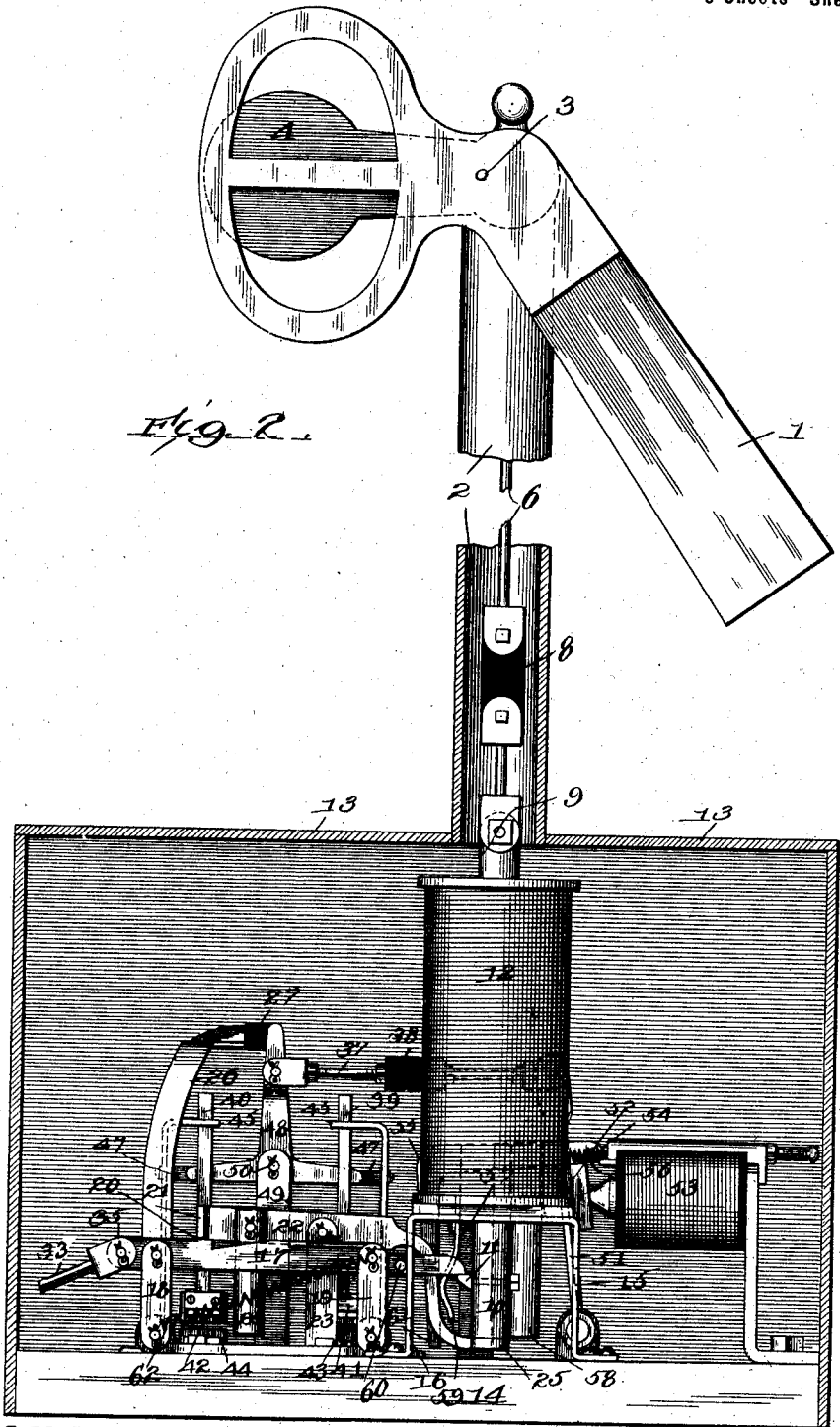

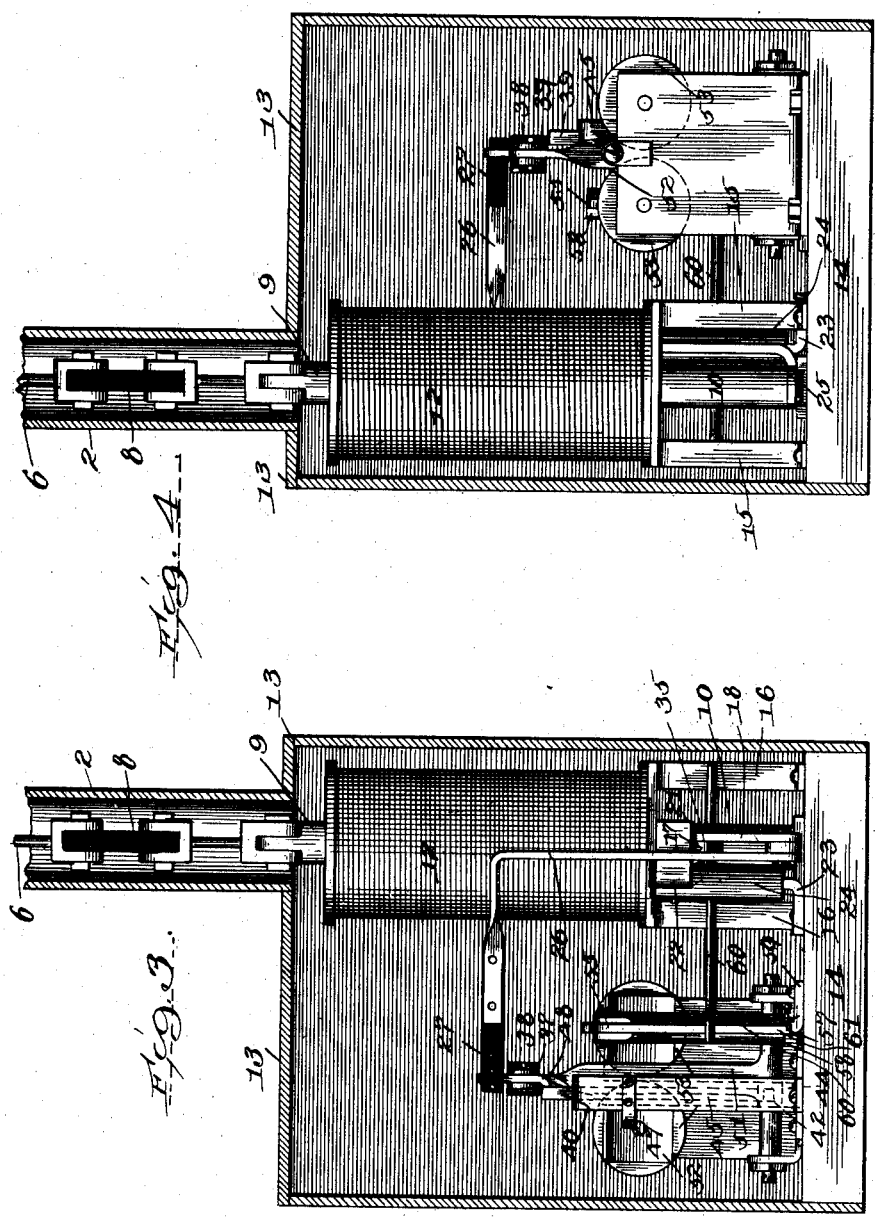

No. 706,586. Patented Aug. 12, 1902.
J. J. McGILL.
AUTOMATIC ELECTROMECHANICAL SEMAPHORE SIGNAL.
(Application filed Aug. 19, 1901.)
(No Model.) 6 Sheets—Sheet 4.
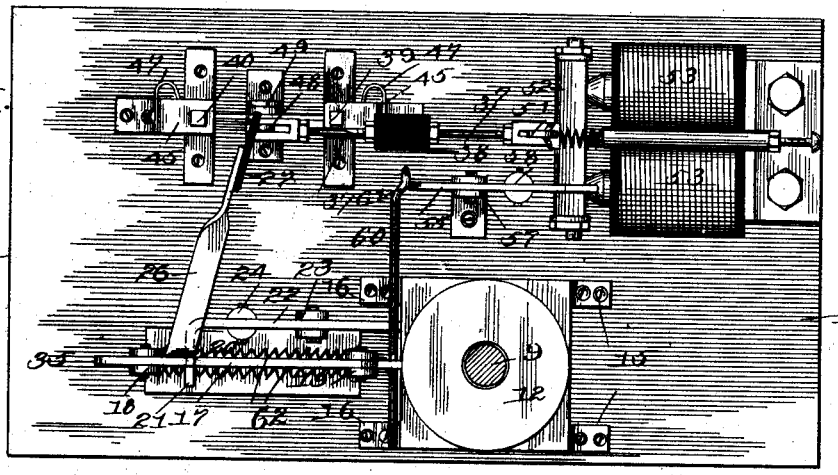
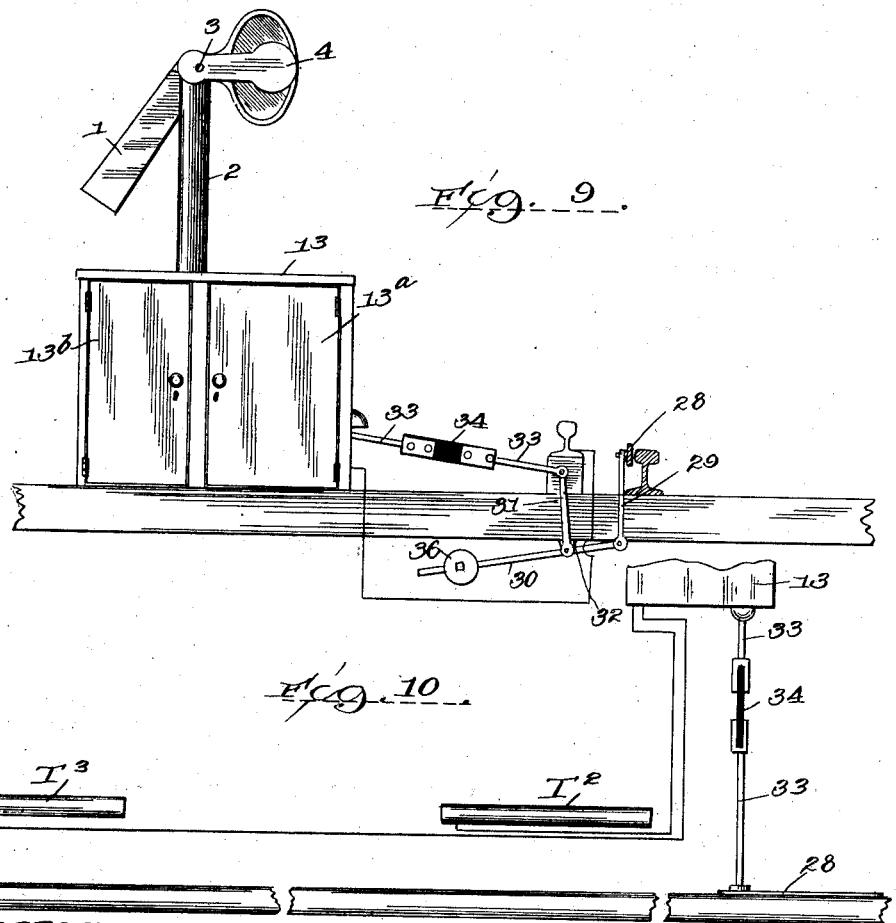

No. 706,586.  
J. J. McGILL.  
Patented Aug. 12, 1902.

AUTOMATIC ELECTROMECHANICAL SEMAPHORE SIGNAL.
(Application filed Aug. 19, 1901.)

(No Model.)

6 Sheets—Sheet 5.

Witnesses  
Harry R. White  
Ray White

Inventor  
John James McGill  
By Joree Bain  
Attorney

No. 706,586. Patented Aug. 12, 1902.
J. J. McGILL.
AUTOMATIC ELECTROMECHANICAL SEMAPHORE SIGNAL.
(Application filed Aug. 19, 1901.)
(No Model.) 6 Sheets—Sheet 6.

UNITED STATES PATENT OFFICE.

JOHN J. McGILL, OF CHICAGO, ILLINOIS, ASSIGNOR OF TWO-THIRDS TO EUGENE W. RICHEY AND SAMUEL A. JOHNSON, OF CHICAGO, ILLINOIS.

AUTOMATIC ELECTROMECHANICAL SEMAPHORE-SIGNAL.

SPECIFICATION forming part of Letters Patent No. 706,586, dated August 12, 1902.

Application filed August 19, 1901. Serial No. 72,549. (No model.)

*To all whom it may concern:*

Be it known that I, JOHN J. MCGILL, of Chicago, in the county of Cook and State of Illinois, have invented certain new and useful Improvements in Automatic Electromechanical Semaphore-Signals; and I hereby declare that the following is a full, clear, and exact description thereof, reference being had to the accompanying drawings, which form part of this specification.

My invention relates to improvements in automatic electromechanical semaphore-signals.

The object of my invention is to provide a signal which is designed to be placed at suitable intervals along a railway-track, the said tracks being divided into blocks, each of the said blocks being protected by one of the signals. The effect of the train moving into the preceding block produces a mechanical operation which sets the signal to "danger," and at the time when the train is leaving the said block an electric circuit is closed, thereby setting the said signal for "safety." The signal is automatically set to "danger" by a mechanical means operated by the passing of the train over a part of the track adjacent to which a mechanically-moving lever is placed, and it is set to "safety" by the act of closing an electric circuit at a remote point or when the train leaves the block.

One of the objects of my invention is to simplify the construction and arrangement of the parts and to render the operation thereof more certain and positive.

A further object of my invention is to provide a means whereby the signal is set to "danger" by a mechanical operation and is released from such a position or set to "safety" by means of an electric current acting through the proper circuit and mechanism for this purpose, and leaving all electric circuits open when the semaphore is set to "safety."

Figure 7:
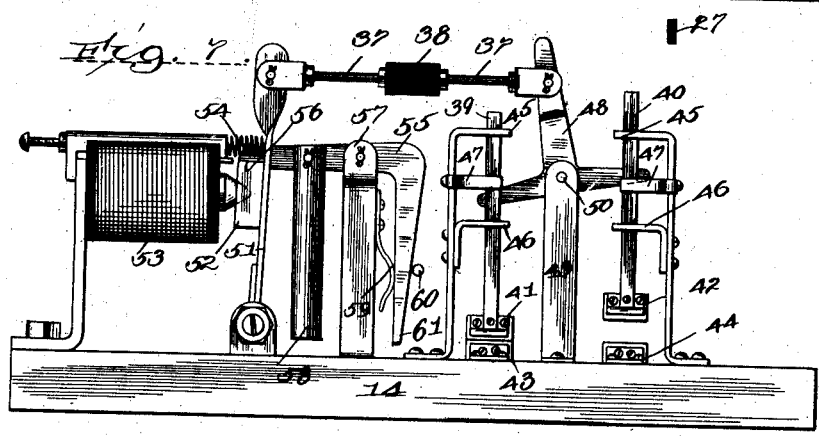
Figure 8:
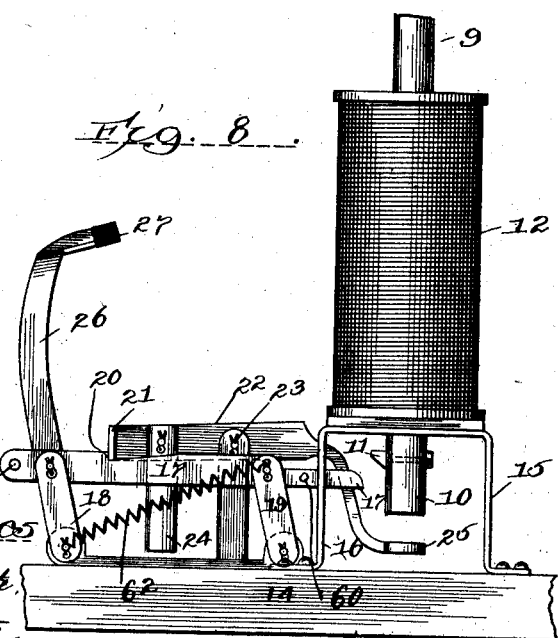
Figure 11:
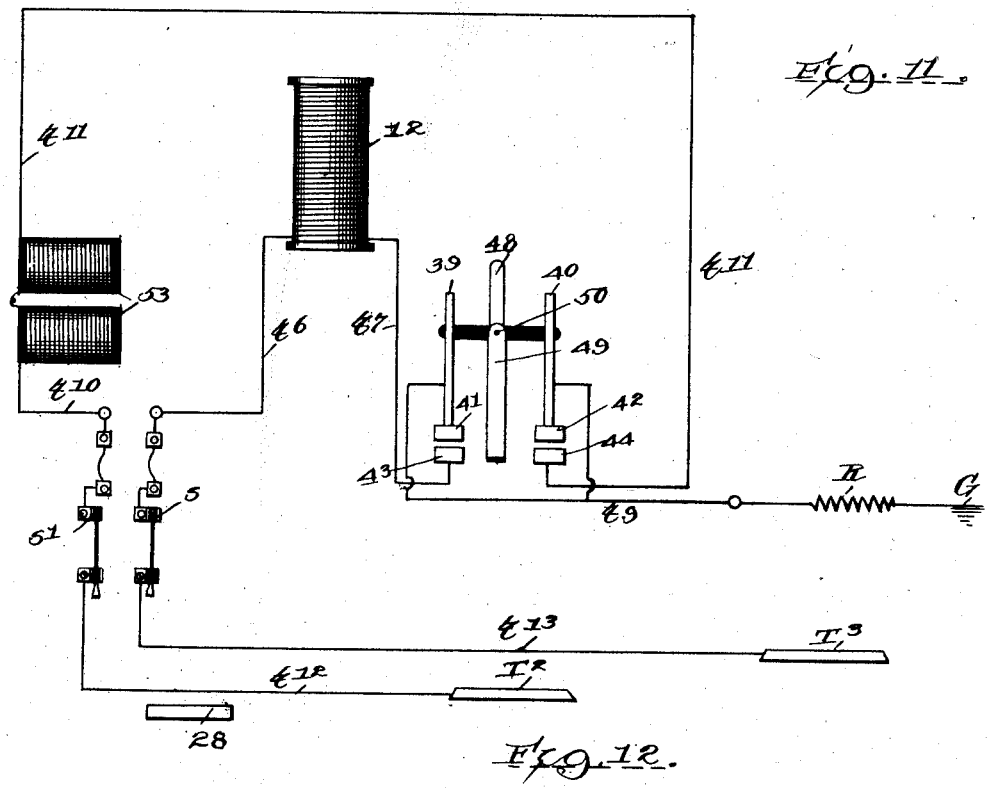
Figure 12:
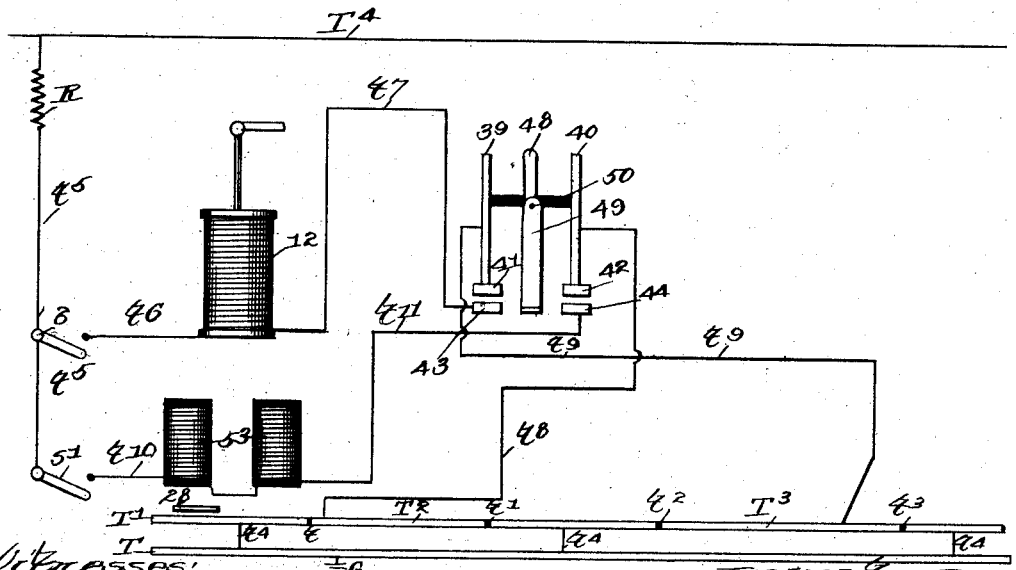

In the drawings, Figure 1 is a side elevation showing the case and supporting-tube in section and showing the semaphore-signal in position to indicate "safety" and all of the parts of the apparatus in corresponding position. Fig. 2 is a similar elevation of the device from the opposite side. Fig. 3 is a similar view showing the apparatus from the front. Fig. 4 is an elevation showing the apparatus from the rear. Fig. 5 is a plan view. Fig. 6 shows the position the parts occupy when the intermediate circuit is closed through the switch-shifting magnet. Fig. 7 shows the position the parts occupy when the circuit is closed through the motor or releasing magnet. Fig. 8 shows the position of the parts coacting with the motor-magnet when the semaphore is set to "danger." Fig. 9 is a side elevation of the apparatus and the weatherproof case in which it is contained, showing its relative position to the rails of the railway-track, also showing the depression-bar by means of which the semaphore is automatically set to the danger position. Fig. 10 is a plan view of the same. Fig. 11 is a diagram of circuits, showing the apparatus as applied to a third-rail system. Fig. 12 is a diagram of circuits, showing the apparatus as applied to a trolley system. Fig. 13 is a section through the motor-magnet armature and the armature extension.

In all of the views the same numerals and letters indicate similar parts.

1 is the usual semaphore arm or blade, which indicates "danger" when in a horizontal position and which indicates "safety" when in the positions shown in Figs. 1 and 2. It is pivoted in a tubular support 2 at the point 3 and is substantially counterbalanced by the weight 4. As a matter of fact the weight 4 is somewhat heavier than the arm or blade 1 and when free to move will assume a vertical position and place the arm 1 in a substantially horizontal position. The crank-pivot 3, upon which the semaphore 1 is fixed and with which it freely turns, is supported on either side in bearings made in the walls of the tube 2. Between these supports a crank 5 is provided, to which the vertical rod 6 is connected, having free easy movement thereon. This vertical rod is provided with an insulating-break 8 and is fixed into the upper end of an electric solenoid-armature 9.

The armature 9 is provided with a brass or other diamagnetic downwardly-projecting extension 10, which carries a lug 11 on its lower end. When the lug 11 is not engaged by some part of the apparatus that is not adapted to move vertically, the weight 4 will descend to a practically perpendicular or vertical position, and the signal-arm 1 will be carried thereby out to a substantially horizontal position, and the crank-arm 5 will at the same time raise the armature 9 and its extension 10 to approximately the position shown in Fig. 8. The magnet 12 when energized will draw the armature 9 back into the position in which it is shown in Fig. 1 and raise the weight 4 and correspondingly depress the blade 1.

The semaphore-signal and the tubular support 2 are held in place upon the weather-proof casing 13.

A base 14, preferably of insulating material, supports all of the apparatus within the case.

The magnet 12 is shown supported thereon by means of legs 15 and 16.

A laterally-moving lever 17 is supported upon arms 18 and 19, which are adapted to be oscillated and to impart to the lever 17 a laterally-reciprocating parallel motion. The lever 17 is provided with a notch 20, into which one end 21 of a detent of the lever 22 is adapted to engage. The lever 22 is pivoted on the support 23 and is held normally in the position shown in Fig. 2 by means of the weight 24. It is provided with an extended end 25, which is located immediately under the armature extension 10 and which is adapted to be displaced thereby when the armature descends, in which event the detent 21 of the said lever is lifted from the notch 20 of the lever 17. An arm 26, to move with the lever 17 in this instance, is provided by extending one of the links 18, and it carries on its laterally and upwardly extended end an insulating-piece 27.

A track-bar 28, which is adapted to have a vertical movement and to be depressed by the wheels of a passing car or locomotive, is a means by which the horizontal arm 17 is reciprocated upon the links 18 and 19. To the bar 28 a vertical link 29 is pivoted, which in turn is pivoted to a substantially horizontal lever 30. This lever is provided with a laterally-extending crank-arm 31, pivoted at the point 32 in a stationary bracket. A rod 33 is provided with an insulating-break 34 and is adapted to be connected with the lever 17 at the terminal 35. A weight 36 is adapted to be moved along the lever 30 and is designed to hold the depression or track bar 28 in an upward vertical position above the track-rail, as shown in Fig. 9. The weight 36 may be adjusted along the lever 30 for the purpose of regulating the pressure or its effect upon the pressure-bar 28.

The shifting electric switch is comprised in the vertical rods 39 and 40, which are provided on their lower ends with carbons 41 and 42. These carbons are adapted to make electrical contact with similar conducting stationary carbons 43 and 44. I have shown carbons in the drawings; but of course it is obvious that mercury in suitable cups or other circuit-closing means may be used instead of carbons for completing the electrical circuit.

The vertically-reciprocating rods 39 and 40 are supported in brackets 45 and 46, in which they have free vertical movement. Electric conducting-brushes 47 bear on these rods for the purpose of completing the electric circuit between the vertical supports and the said rods.

The rods 39 and 40 are slotted, and into these slots the horizontal ends of an oscillating lever 48 are passed. The lever 48 is oscillated upon a vertical support 49, being pivoted at the point 50. The upper end of the lever 48 is connected to an oscillating armature-lever 51 by means of a rod 37, which is insulated at 38. The lever 51 carries an armature 52, which is responsive to the electromagnet 53 and is adapted to be moved in one direction thereby and in the opposite direction by an open pressure-spring 54. A bell-crank arm 55 is provided with a notch 56 in its free horizontal end. It is pivoted to a vertical stationary support 57, the horizontal end thereof being held in its depressed position by means of the weight 58 and by the auxiliary spring 59. Either or both of these means may be employed for this purpose. When the armature 54 is drawn toward the magnet 53, the notch 56 of the lever 55 drops in behind the armature and holds it in that position against the action of the spring 54 after the current has been withdrawn from the magnet 53, as shown in Fig. 7. A horizontal lever 60 is fixed into the lever 17 and moves therewith and is adapted to depress the lower end 61 of the lever 55, so as to raise the horizontal notched end 56 out of contact with the armature 52 when the lever 17 is oscillated by means of the pressure-bar weight 36. A spring 62, which is less powerful than the weight 36, is arranged to automatically move the lever 17 into the position shown in Fig. 8 and to cause the detent 11 to release the armature 9 and the connected signal to go to "danger" in the event that the operating-bar 33, which connects the track-bar 28 and the lever 17, should accidentally become disengaged from said lever or bar or broken, in which event the track-bar would thereby become powerless to operate the signal. By the operation of the spring 62 the signal would go to "danger" in the event that the connection between said signal and track-bar should become by any means displaced.

In Fig. 12 the track-rails are represented by T and T'. Sections of the track $T^2$ and $T^3$ are insulated from the main rail at the points $t$, $t'$, $t^2$, and $t^3$. The uninsulated sections are cross-connected to the rails T by means of bonds $t^4$. $T^4$ represents a trolley-wire from which the current is taken (in this illustration) to operate my signal, as when the apparatus is used in connection with electric street-railways. R is the resistance that is to be inserted in the circuit, so as to reduce the electromotive force of the operative current when applied to the electrical parts of my device. The switches S and S', with automatic cut-outs, such as fuses, connect the wires $t^5$ to the respective circuits. The magnet 12 is connected to the switch S by means of the wires $t^6$ and to the lower contact 43 of the shifting switch by means of the wires $t^7$. Insulated sections $T^2$ and $T^3$ are connected, by means of the insulated wires $t^8$ and $t^9$, to the respective rods 40 and 39. The switch S' is connected to the switch-shifting electromagnet 53 by wire $t^{10}$, and the magnet is connected to the shifting switch-point 44 by means of the wire $t^{11}$.

Fig. 11 represents a diagrammatic view of the connections of my apparatus when applied to a third-rail railway system in which the current is taken from the third rail. $T^2$ and $T^3$ represent either an insulated section of the track or insulated pieces of metal that may be laid parallel with the track at proper locations. R is a suitable resistance for reducing the electromotive force or potential of the current applied to my apparatus. The insulated section $T^2$ is connected to the switch S' by means of wire $t^{12}$. Insulated section $T^3$ is connected to the switch S by means of the wire $t^{13}$. The other connections are similar to those shown in diagram Fig. 12.

The use and operation of my device is as follows: Normally the semaphore and all of the parts of the apparatus are in the position shown in Figs. 1 and 2, in which the semaphore indicates "safety." When a train approaches a block to be protected by my signal, the tread of the wheel rides upon the depression-bar 28 and depresses it, thereby raising the lever 30 and the weight 36 into a more elevated position, and by means of the bell-crank arm 31 the rod 33 is drawn toward the track, and the lever 17, to which the said rod is attached, is brought into the position shown in Fig. 8, when the detent 21 of the lever 22 will engage with the notch 20 and hold the arm 17 in this position after the train has passed over the pressure-lever 28. When the lever 17 is brought into this position, it is disengaged from the lug or detent 11 of the armature extension 10 of the armature 9. Being thus released, the weight 4 of the semaphore will descend into practically a vertical position with reference to the support 2 and the blade 1 will be raised thereby into a practically horizontal position, indicating "danger." At this time the crank 5 will be raised into a correspondingly-upward position, so that when the magnet 12 is again energized and the armature 9 is drawn therein the crank-arm 5 will restore the blade 1 to its normal safety position. After the train has passed the pressure-bar 28 and the semaphore has assumed the position of danger, as described, the train has then entered the block guarded by the said semaphore. Normally the insulated extension 27 of the arm 26 rests against the vertical arm 48 of the operating-lever, and thereby the brushes 41 and 42 are held separated from their respective contacts 43 and 44. When, however, the arm 26 is caused to assume the position shown in Fig. 8, (by reason of the pressure-bar 28 moving the lateral lever 17 into the position shown in Fig. 8,) the arm 26 is thereby withdrawn from its contact with the arm 48, and the spring 54 presses the armature-lever 51, and by this means the vertical arm 48 of the oscillating switch-lever into the position shown in Fig. 6, and thereby closes the circuit between the brush-contacts 42 and 44. This action closes the circuit, including the magnet 53, through the shifting switch. As soon as the insulated section $T^2$ of the rail is grounded to the rail T by means of the wheels of the train connecting the two together this intermediate circuit will be thereby completely closed after the train leaves the bar 28, and when it passes onto the insulated section $T^2$ the circuit is completed from the ground through the wheels and axles of the train to the insulated section $T^2$ through the wire $t^8$ to the shifting switch, thence to the contacts 42 and 44 through the vertical reciprocating rod 40 to the wire $t^{11}$, the magnet 53 over the wires $t^{10}$ and $t^5$ through the resistance R to the trolley-wire $T^4$. When the circuit is completed over this branch, the electromagnet 53 is energized and the armature 52 is attracted thereby. At this time the notch 56 of the lever 55 will engage with the rear surface of the armature 52 and hold the armature in this position or in the position shown in Fig. 7. By this action the oscillating arm 48 is moved to the left, with the vertical rod 39 carrying the brush 41, until the said brush makes contact with the brush 43, which closes the circuit through the motor-magnet 12, the contacts 42 and 44 being coincidently separated. The crank-arm 55, by virtue of the notch 56, holds the armature, and thereby the apparatus is retained in the position shown in Fig. 7 after the circuit containing electromagnet 53 has been broken by the train passing beyond the insulated section $T^2$. The circuit is completed through motor-magnet 12 at contacts 41 and 43. When the train reaches the insulated section $T^3$, which is located at the end of the block, the circuit is closed between the said insulated section and the rail T, which is grounded through the wire $t^9$ to the shifting switch, through the vertical rod 39, the carbon contacts 41 and 43, through the wire $t^7$, the motor-magnet 12, through the wire $t^6$, through the switch S and the wire $t^5$, the resistance R to the trolley-wire $T^4$, energizing the motor-magnet 12, causing it to draw down its armature 9, and thereby to lift the counterweight 4 by virtue of the crank-arm 5 into the position of safety. (Shown in Fig. 1.) When the armature 9 is drawn down by the magnet in the manner described, the extension 10 of the said armature depresses the lever 22 by coming in contact with the extension 25, when the detent 21 of the lever 22 will be raised from the notch 20 of the laterally-moving lever 17. The lever 17 and the rod 33 being thus released, the weight 36 of the arm 30 will again shove the lever 17 into the position that it occupied before the train passed over the depression-lever 28, that position being that of safety, (shown in Figs. 1 and 2,) at which time the arm 26 will be carried forward until it is brought into contact with the vertical arms 48, which it will raise to a practically vertical position, whereby the contacts between the carbons 41 and 43, 42 and 44, respectively, will be broken and the circuits connected thereto thereby opened. At this time the semaphore will indicate "safety" and all the circuits connected to my apparatus will be open. Coincidently the laterally-extending rod 60, carried by the lever 17, will trip the crank-arm 61, and the armature-lever 51 will be thereby released, when the spring 54 will press the arm 48 over against the movable stop 27, after which all of the parts will occupy their normal position, as shown in Figs. 1 and 2.

Should the electrical apparatus fail to operate in the manner described, the semaphore will continue to indicate "danger."

Diagram Fig. 11 is similar in its effect and functions to diagram Fig. 12, the only difference being that the current will be directed to the insulated section $T^2$ $T^3$ from contacts carried on the moving train, which are in electric connection with the third rail or any other source of electric energy with which the train has communication. Each train or engine may carry a special battery that is designed to operate all of the signals upon a given road, and the contacts may be carried by the train for imparting the electric current to the insulated surface connected with my device.

The object of the intermediate circuit in which the magnets 53 are located is to close the circuit for the motor-magnets. The office of this latter magnet is to return the semaphore to a position of safety and to release the mechanism that automatically engages the semaphore-moving means, so as to retain it in the position to which the said magnet has moved it, and thereby hold it in the position of safety.

It will be noticed that all of the apparatus constituting my invention is contained within a weatherproof case, that all of the operating parts are thereby protected against extraneous influences, that the case 13 is accessible by means of the doors 13ª and 13ᵇ, and these doors are fitted with water-tight joints into their proper casings.

It is evident that a considerable latitude of variation may be made from the drawings which are used to illustrate my invention without departing from the true gist and scope thereof.

Having described my invention, what I claim as new and useful, and desire to secure by Letters Patent of the United States, is—

1. In a railway-track signal the combination, of a mechanically-operated connection between said signal and a railway-track whereby said signal is released by the passing train, and mechanically moved to danger position, an electric switch-shifting magnet for controlling the electric circuits of said signal, a motor-magnet for moving and setting said signal to safety position when said magnet is energized, a circuit closed by the passing train for energizing the switch-shifting magnet, and a circuit subsequently closed by the said train for energizing said motor-magnet, substantially as set forth.

2. In a railway-track signal the combination, of a mechanically-operated connection between said signal and a railway-track whereby said signal is released by the passing train and mechanically moved to danger position, an electric switch-shifting magnet, and an electric motor-magnet, a circuit for each magnet, a track-circuit closer for each circuit, a switch for controlling both circuits and adapted to be shifted by the switch-shifting magnet, a means operated by the passing train for energizing the circuit containing the switch-shifting magnet to close the circuit at the switch containing the motor-magnet, and a means operated by the passing train for subsequently energizing said motor-magnet, whereby said signal is moved and set to safety position, substantially as set forth.

3. In a railway-track signal the combination, of a mechanical means, located at one end of a block for setting said signal to "danger" by the passing train, an electric motor-magnet for returning said signal to "safety," a circuit-closer operated by the passing train, located at the other end of the block, a circuit containing said motor-magnet and adapted to be closed by said circuit-closer, a switch-shifting magnet, a circuit containing said shifting-magnet, and a circuit-closer adapted to be operated by the passing train, located intermediate of the first-named circuit-closer and the said mechanical means, for setting the signal, and an electric switch for controlling both circuits operated by the switch-shifting magnet, substantially as set forth.

4. In a railway-track signal the combination, of a track pressure-bar, a semaphore, a motor-magnet adapted to move said semaphore to a position of safety, and to open its own circuit, when energized, a means for retaining the said semaphore in the position to which it is moved by said magnet, and a connection between said pressure-bar and said means adapted to release said semaphore when said pressure-bar is depressed by a passing train, substantially as set forth.

5. In a railway-track signal the combination, of a track pressure-bar, a semaphore adapted to automatically return to the danger position, a solenoid, an armature-core thereof connected to said semaphore and adapted to move it to the safety position, a detent carried by said armature, a lever adapted to engage said detent for retaining said semaphore in said position, a connection between said lever and said pressure-bar, whereby said lever is adapted to be disengaged from said detent, a latch for holding said lever and said detent separated, said latch adapted to be tripped by said armature when said solenoid is energized, and a means for bringing said lever and said detent again into engagement, substantially as set forth.

6. In a railway-track signal the combination, of an electric motor-magnet adapted to move a semaphore to safety position when energized, a retaining device for holding said semaphore in position to which it has been moved by said magnet, a semaphore adapted to automatically return to danger position when so released, a track-bar adapted to be moved by a passing train, and a connection between said bar and said retaining device, for releasing said semaphore, substantially as set forth.

7. In a railway-track signal the combination, of an electric motor-magnet adapted to move a semaphore to safety position when energized, a retaining device for holding said semaphore in position, to which it has been moved by said magnet, a semaphore adapted to automatically return to danger position when so released, a track-bar adapted to be moved by a passing train, a connection between said bar and said retaining device for releasing said semaphore, an electric circuit containing said motor-magnet, and a circuit-controller adapted to be operated by a passing train located near the track at a remote point from the semaphore, substantially as set forth.

8. In a railway-track signal the combination, of a track pressure-bar adapted to release a semaphore, a semaphore adapted to automatically return to danger position when released, a circuit containing a switch-shifting magnet, adapted to be closed when said semaphore is released, an electric motor-magnet adapted to move said semaphore to safety position when energized, a means for energizing said switch-shifting magnet operated by the passing train, and a switch shifted by said switch-shifting magnet whereby its own circuit is broken, and the circuit containing said motor-magnet is closed and a means operated by the passing train for energizing said motor-magnet, substantially as set forth.

9. In a railway-track signal the combination, in a weatherproof case 13, a tubular support 2, a semaphore mounted upon a crank in the top of said support, an insulated bottom 14, mechanism for operating said semaphore in said case, and a connecting-rod between said semaphore-crank and said mechanism contained within said tubular support, substantially as set forth.

10. In a railway-track signal the combination, of a semaphore, a means for moving said semaphore to safety position, a track-bar adapted to be moved by a passing train, a connection between said track-bar and said semaphore for releasing said semaphore, and a means coacting with said bar to release said semaphore, and adapted to independently release said semaphore in the event of the connection between said bar and said semaphore becoming removed or otherwise inoperative, substantially as set forth.

11. In a railway-track signal the combination, of a track pressure-bar, a semaphore adapted to return to danger position when released, a rod connecting said semaphore and said pressure-bar and adapted to release said semaphore when moved in one direction, and to hold a retaining-lever in position when moved in the other direction, an electric motor for moving said semaphore to safety position, a retaining device for holding said semaphore in the said position, and a spring adapted to displace said retaining device when said bar is removed, substantially as set forth.

In testimony that I claim the foregoing as my own I affix my signature in presence of two witnesses.

JOHN J. McGILL.

In presence of—
 E. W. RICHEY,
 M. F. ALLEN.